(12) United States Patent
Szwaykowski et al.

(10) Patent No.: US 7,483,145 B2
(45) Date of Patent: Jan. 27, 2009

(54) SIMULTANEOUS PHASE SHIFTING MODULE FOR USE IN INTERFEROMETRY

(75) Inventors: Piotr Szwaykowski, Glendale, CA (US); Raymond J. Castonguay, Tucson, AZ (US); Frederick N. Bushroe, Tucson, AZ (US)

(73) Assignee: Trology, LLC, Tucson, AZ (US)

( * ) Notice: Subject to any disclaimer, the term of this patent is extended or adjusted under 35 U.S.C. 154(b) by 18 days.

(21) Appl. No.: 10/536,378

(22) PCT Filed: Nov. 26, 2003

(86) PCT No.: PCT/US03/38004

§ 371 (c)(1),
(2), (4) Date: Feb. 6, 2006

(87) PCT Pub. No.: WO2004/051182

PCT Pub. Date: Jun. 17, 2004

(65) Prior Publication Data

US 2006/0146340 A1   Jul. 6, 2006

Related U.S. Application Data

(60) Provisional application No. 60/459,149, filed on Mar. 31, 2003, provisional application No. 60/429,610, filed on Nov. 27, 2002.

(51) Int. Cl.
*G01B 9/02* (2006.01)
(52) U.S. Cl. ..................................... 356/491
(58) Field of Classification Search ................. 356/450, 356/491, 492, 493, 494, 495
See application file for complete search history.

(56) References Cited

U.S. PATENT DOCUMENTS

| | | | |
|---|---|---|---|
| 3,950,103 A | 4/1976 | Schmidt-Weinmar | |
| 4,583,855 A | 4/1986 | Bareket | 356/351 |
| 4,872,755 A | 10/1989 | Kuchel | |
| 6,128,080 A * | 10/2000 | Janik et al. | 356/491 |
| 6,304,330 B1 | 10/2001 | Millerd et al. | 356/521 |
| 6,552,808 B2 | 4/2003 | Millerd et al. | 356/521 |
| 2003/0095264 A1 * | 5/2003 | Ruchet | 356/491 |

FOREIGN PATENT DOCUMENTS

DE    196 52 113    6/1998

(Continued)

OTHER PUBLICATIONS

Hettwer, et al., "Three Channel Phase-Shifting Interferometer Using Polarization-Optics and a Diffraction Grating", The International Society for Optical Engineering, Optical Engineering, vol. 39, pp. 960-966, Apr. 2000 (abstract only).

(Continued)

*Primary Examiner*—Michael A Lyons
(74) *Attorney, Agent, or Firm*—Hayes Soloway P.C.

(57) ABSTRACT

A back-end assembly for use with a front-end assembly in acquiring phase-shifted interferograms having a plurality of imaging modules (Ma, Mb, Mc). Each module (Ma, Mb, Mc) has a quarter wave plate (30a, 30b, 30c), a polarizer (32a, 32b, 32c), and an image sensor (34a, 34b, 34c) so that each polarizer has a different rotation orientation thus acquiring phase-shifted interferograms.

17 Claims, 3 Drawing Sheets

FOREIGN PATENT DOCUMENTS

WO    WO 2004/051182    6/2004

OTHER PUBLICATIONS

Nakadate et al., "Real-Time Fringe Patter Processing and its Applications", Proc. of SPIE, vol. 2544, pp. 74-86, Jun. 1995 (abstract only).

Sivakumar, et al., "Large Surface Profile Measurement with Instantaneous Phase-Shifting Interferometry", Optical Engineering, Feb. 2003, vol. 42, Issue 2, pp. 367-374 (abstract only).

Koliopoulos, Chris L., "Simultaneous Phase-Shift Interferometer", Proceedings of SPIE, vol. 1531, Advanced Optical Manufacturing and Testing II, 1992, pp. 119-127.

* cited by examiner

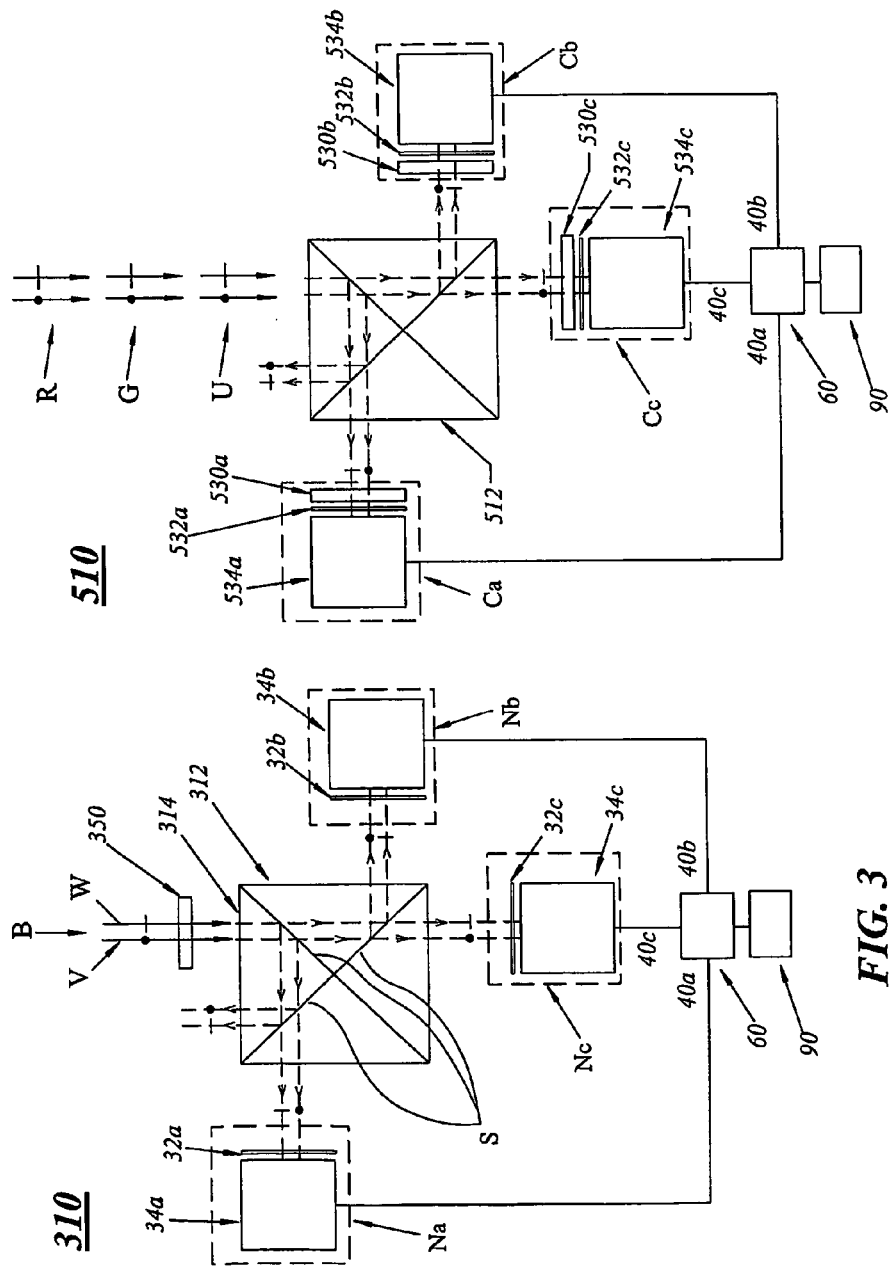

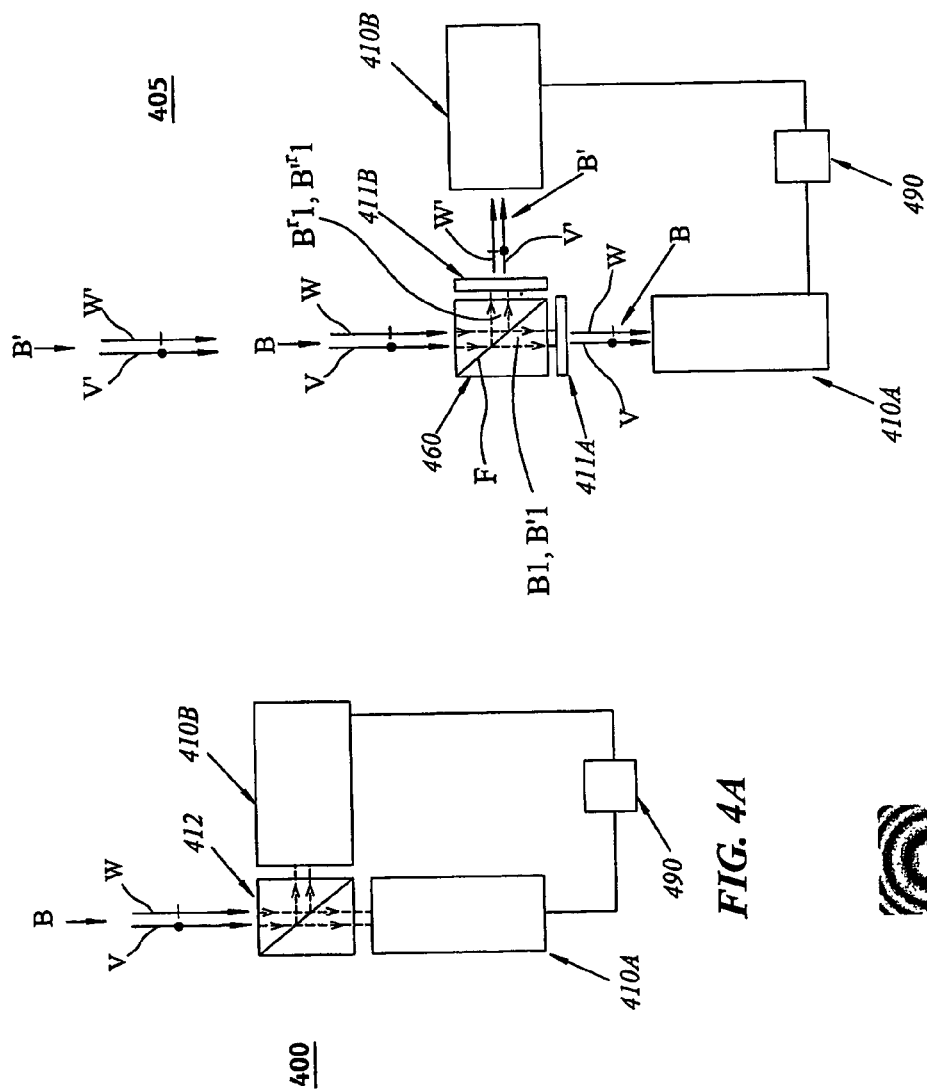

SIMULTANEOUS PHASE SHIFTING MODULE FOR USE IN INTERFEROMETRY

CROSS-REFERENCE TO RELATED APPLICATIONS

This application is a National Phase Patent Application of International Application Number PCT/US03/38004, filed on Nov. 26, 2003, which claims priority of U.S. Provisional Application Ser. No. 60/459,149, filed Mar. 31, 2003, and U.S. Provisional Application Ser. No. 60/429,610, filed Nov. 27, 2002.

FIELD OF THE INVENTION

The present invention relates to interferometry, in particular, interferometry involving the measuring of wavefronts through use of phase-shifted interferograms. Specifically, the present invention relates to interferometers with reduced sensitivity to vibration or other disturbances for use in capturing data from stationary objects and moving objects.

BACKGROUND OF INVENTION

Interferometers have been known and used for a long time. Interferometry is a widely used method for measuring surface profiles (often to nano-meter resolutions) and other physical properties of materials, gases and liquids. There are many types of interferometers, characterized by their optical designs and layouts. Some classical types are Twyman-Green, Fizeau, Michaelson, Mach-Zender, and Fabry-Perot. Each of these interferometer types produces interference patterns, called interferograms. These interferograms (see FIG. 6) can be used to analyze characteristics of an object under test.

Interferograms are generated by the interference of a test wavefront and a reference wavefront. The test and reference wavefronts typically originate from a common "source" wavefront; they are obtained by splitting the source wavefront. The test wavefront then obtains its "test" information by interacting with the object under test (typically by reflecting off of, or transmitting through a test object). Similarly, the reference wavefront obtains its "reference" information by interacting with a "known" reference object, such as a super polished flat glass plate. Superimposing or interfering these two wavefronts spatially (i.e. on a flat screen, or on an image sensor such as a CCD) produces an interferogram.

Interferometers require coherent superposition of a "test beam" (of light) with a "reference beam" resulting in the formation of an interferogram in the overlapping region of the two beams. This interferogram data can then be captured using various types of detectors, such as a camera, for analysis.

The spatial distribution of intensity levels within the interference pattern (see FIG. 6) relates to differences in the phase of the test and reference wavefronts. Note that the reference wavefront is acted on by a known "measurement standard," such as an optical "reference" surface, and the test wavefront is acted on by the unknown object under test. Measuring the difference between the two wavefronts allows the test wavefront to be determined. In other words, the process is akin to comparing the "unknown" test wavefront to a "known" standard, the reference wavefront.

A single interferogram is usually insufficient to obtain the accuracy required for many applications. A variety of methods have been developed to acquire multiple phase-shifted interferograms as a means to increase accuracy and resolution of the measurement. Phase-shifting techniques require altering the phase between the two interfering wavefronts by introducing controlled phase delays between the test and reference beams. These added phase-shifts supply additional information that can be used to compute the test wavefront significantly more accurately. Almost all current techniques of phase shifting use sequential or "temporal" methods to introduce phase differences while multiple interferograms are acquired serially in time. However, in practice, these temporal methods cannot be used effectively in the presence of relatively fast changing environmental conditions (such as vibrations, air turbulences, etc), or when the object under test cannot be stabilized (i.e. vibrating), or when the object under test is in motion. For example, problems can arise because the interferometer typically acquires three to twelve frames (images) or phase shifted interferograms, serially in time, (typically spaced 30 ms apart for standard video), and during this acquisition time (for three to twelve frames), any vibration that occurs between the test and reference object often causes measurement errors.

Thus, methods have been developed to acquire multiple phase-shifted interferograms simultaneously. These methods usually require that the reference and test beams ("beams" and "wavefronts" used interchangeably herein, with a "wavefront" being understood as propagating along the optical axis and sweeping out a volume that defines the light beam) be orthogonally polarized, thus allowing independent access to either one of these beams (such as via polarization optics), even when they are spatially overlapped. With this "independent access", multiple phase-shifts can be introduced simultaneously (as opposed to temporally), by retarding or advancing the phase of one beam with respect to the other. Altering the phase of a beam is typically accomplished through the use of wave plates or polarization beam splitters. In practice, this is accomplished by splitting the superimposed test and reference beams into three or more channels with each new channel having orthogonally polarized test and reference beam components. For each new channel, one of the beam components (test or reference) is then phase-shifted relative to the other beam component. This phase shift, or phase delay, is adjusted to be different in each channel. There are multiple methods for splitting the superimposed test and reference beams into multiple channels and multiple methods for phase-shifting within each channel. However, as discussed below in further detail, such known methods have disadvantages, including dissimilar beam paths attributable to different path distances and/or different optical elements.

U.S. Pat. No. 4,583,855 (Bareket) describes a Twyman-Green type interferometer with an arrangement for producing three simultaneous interferograms that are mutually phase shifted by 90° with respect to each other. This system relates to the use of test and reference beams that are mutually orthogonally polarized; however, the system is substantially asymmetric. As such, the system can be difficult to align and a constant magnification in all three beam paths difficult to maintain.

A system similar to Bareket's has been described by Sivakumar, (Optical Engineering, Vol. 42 page 367), which therefore shares most of the characteristics and issues of Bareket's system. This system is also directed to fixed phase shifts between each channel.

In the publication "Simultaneous Phase Shift Interferometer" (Proc. of SPIE, Advanced Optical Manufacturing and Testing II, January 1992) by C. Koliopoulos, a polarization type Twyman-Green interferometer is described. This system is also asymmetric and has different optical path lengths. This system may also suffer from complex geometry and being a relatively large size.

A publication entitled "Real-time fringe pattern processing and its applications" (Proc. of SPIE, Vol. 2544, pp. 74-86, 1995) by S. Nakadate describes a system of linearly cascaded, non-polarizing beamsplitters and a reflector. This system of beamsplitters is substantially asymmetric and non-standard. In a real world application, where imaging optics are present to image the object onto the cameras, the asymmetry of the optical paths in this system can make it difficult to provide in-focus positions of the imaging cameras and/or to maintain constant magnification. Other issues can also be raised due to the number and complexity of optical elements traversed in each of the beam paths.

Another method proposed by J. W. Schwider (German Patent No. DE 196,52,113,A1) uses a diffractive optical element to split a beam composed of mutually orthogonally polarized test and reference beams. Although diffractive elements appear attractive as beam splitters, actual diffractive components can be difficult and expensive to produce. This approach also involves a CCD camera whose resolution can affect the quality of the interferograms. A similar approach has been offered by Millerd, U.S. Pat. No. 6,304,330 and U.S. Pat. No. 6,552,808. Along with camera resolution issues, this method shares other drawbacks of the Schwider method, including sub-pixel alignment issues, and fixed at 90° phase shifts.

In view of the foregoing, major disadvantages of prior simultaneous phase-shifting methods include unequal pathlengths and dissimilar optical elements in each of the phase-shifted beam paths. This causes a variety of problems including different magnifications, unequal optical and polarization aberrations, and non-uniform light distributions in each of the phase-shifted paths.

Thus, there is a desire for an improved interferometer, in particular, a back end assembly adapted for use with an interferometer to render the interferometer less sensitive to vibrations or other disturbances so as to increase and improve performance capabilities. The desire includes greater and better performance capabilities in capturing data from stationary objects and from moving objects.

SUMMARY OF THE INVENTION

The present invention is directed to an assembly, for use as a back-end of an optical interferometer, and related method, that measures wavefronts by simultaneously producing a set of phase-shifted interferograms. The assembly can be used as a "phase shifting module" in a variety of different interferometers whose front-end is capable of producing test and reference wavefronts which are linearly orthogonally polarized with respect to each other.

In one embodiment, the back-end assembly for acquiring phase-shifted interferograms has a beamsplitter configured to receive incidental beams of two linearly orthogonal states of polarization and to output exit beams where such relative states of polarization are preserved. The assembly also has imaging modules, where each module is positioned to receive an exit beam from the beamsplitter. To arrange for a common state of polarization between the two linear orthogonal states of polarization, each of the imaging modules has a quarter wave plate and a polarizer through which the beams travel and are acted upon to cause an interference that is imaged on a camera in each of the modules for generating an interferogram. To introduce a different relative phase shift between the modules, each polarizer is set with different rotation orientation from the other polarizers.

More particularly, the beamsplitter is selected to provide surfaces that split the incidental beams equally between transmission and reflection and is configured to provide equal path distances to the imaging modules. As such, the beams arrive at their respective imaging modules having traveled similar distances and encountered similar optical elements. The beams also arrive at their respective imaging modules with substantially equal intensity with their states of polarization preserved.

In another embodiment, the back-end assembly uses a single quarter wave plate in lieu of quarter wave plates in each of the imaging modules. The single quarter wave plate is positioned to intercept the incidental beam before it enters the beamsplitter. In this embodiment, the surfaces of the beamsplitter are further adapted to preserve the resulting circular polarization of the beams that travel throughout the beamsplitter.

The present invention also contemplates the back-end assembly as a monolithic structure, whereby the beamsplitter and the imaging modules (inclusive of the quarter wave plates, the polarizers and the cameras) are bonded together or otherwise mounted in a fixed, compact, mechanical relationship.

In yet another embodiment, the back-end system uses at least two back-end assemblies in parallel to produce at least twice the number of simultaneous phase-shifted interferograms available from the use of a single back-end assembly.

The present invention can also be configured to provide dual wavelength simultaneous phase-shifted interferograms. For this application, a back-end system uses at least two back-end assemblies in parallel downstream of a beamsplitter that receive two sets of beams, where the wavefronts of each set have different wavelengths from the other set and each set has two orthogonally polarized wavefronts. In one embodiment, the beamsplitter upstream of the parallel back-end assemblies has wavelength-sensitive surfaces adapted to transmit one wavelength while reflecting another wavelength. Accordingly, beams of one wavelength are transmitted to one back-end assembly, while beams of another wavelength are reflected to the other back-end assembly. In another embodiment, the beamsplitter splits without regard to wavelength the two sets of beam equally into transmitted and reflected wavefronts that passes through optical band filters which permit wavefronts of one wavelength to enter one back-end assembly and wavefronts of the other wavelength to enter the other back-end assembly. With any embodiment, one assembly processes beams of one wavelength while the other assembly processes beams of the other wavelength to enable the back-end system to provide dual-wavelength simultaneous phase-shifted interferograms.

The foregoing and other objects, features and advantages of the invention will be apparent from the following more particular description of the preferred embodiments, taken in conjunction with the accompanying drawings, which illustrate, by way of example, the principles of the invention.

BRIEF DESCRIPTION OF THE DRAWINGS

FIG. 3 is a plan view of an embodiment of the present invention using one quarter wave plate;

FIG. 4A is a plan view of an embodiment of the present invention in a parallel configuration;

FIG. 4B is a plan view of an embodiment of the present invention in a dual wavelength application;

FIG. 5 is a plan view of an embodiment of the present invention in a multi-wavelength application; and FIG. 6 is an example of interferogram showing interference patterns.

DESCRIPTION OF THE INVENTION

Figures 1, 2:
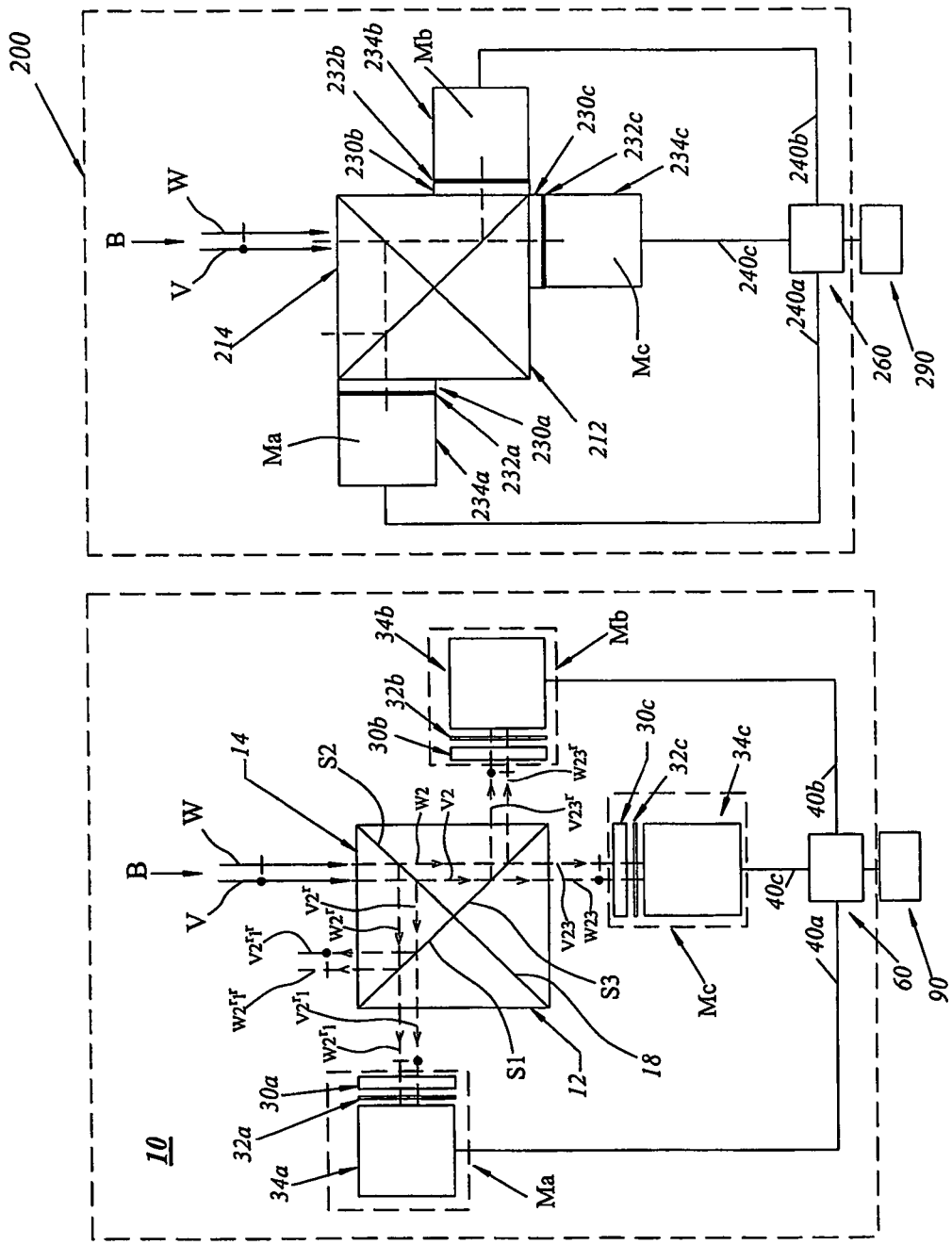
FIG. 1 is a plan view of an embodiment of the present invention.
FIG. 2 is a plan view of an other embodiment of FIG. 1 in a monolithic configuration.

FIG. 1 illustrates a simultaneous phase-shifting assembly 10 in accordance with an embodiment of the present invention. The assembly 10 is used as a back-end of an interferometric system that generates simultaneously phase-shifted interferograms, as used in compiling 3-D surface profiles of an object under test. The assembly 10 may be used with any front-end assembly that provides superimposed or overlapping reference and test beams with mutually orthogonal linear states of polarization, including those assemblies described in a co-pending U.S. patent application entitled "An Interferometric System With Reduced Vibration Sensitivity and Related Method," (Attorney Docket No. T535-51537.PCT), the contents of which are incorporated herein by reference. The front-end assembly of the Fizeau-type configuration described therein may be particularly suited in certain conditions for use with the back-end assembly 10 of the instant invention. However, a front-end assembly having a Twyman-Green, Michaelson, Mach-Zender, Point-Diffraction or many other configurations may also be used with the instant invention, as understood by one of ordinary skill in the art.

"Orthogonally polarized," as used herein, includes not only linear polarizations that are perpendicular such as "s" and "p" polarizations, but any state of orthogonal polarizations, such that the vector product equals zero, for example, right-hand and left-hand circular polarizations. It is understood by one of ordinary skill in the art that the present invention can utilize any orthogonal states of polarization provided that the assembly is suitably altered to make these orthogonal states of polarization circular before the beams enter the phase-shifting polarizers upstream of the image sensors.

The phase shifting assembly or module 10 of FIG. 1 receives the linearly orthogonally polarized test and reference wavefronts and simultaneously divides them to produce three or more phase-shifted interferograms. The resulting simultaneous acquisition of multiple interferograms by the module advantageously enables relatively very fast simultaneous data collection. As such, the module of the present invention, as part of or used with an interferometer, enables, for example, (i) measurements of relatively fast moving objects, and (ii) measurements in the presence of vibration, over conventional interferometers.

The embodiment of the assembly 10 shown in FIG. 1 includes a beamsplitter 12 and a plurality of image detector modules Mi positioned in accordance with a location of beam entry or incidence 14 of the beamsplitter. The beamsplitter may be of a cuboid configuration, having an X-shaped interior 18 whose diagonal "splitting" surfaces Si are approximately equally reflective and transmissive, and which, in this described embodiment, is non-polarizing. In accordance with the present invention, the assembly 10 is configured such that the cube beamsplitter 12 provides equal path lengths (see ray tracings in FIG. 1) to each of the modules Mi. In particular, each of the modules Mi is positioned about the cube beamsplitter 12 such that beams entering the beamsplitter 12, regardless of their polarization state, encounter the same optical elements and travel the same distance to reach a module Mi. The beam intensity at each module is therefore uniform throughout the assembly 10 whereby the resulting interferograms are not compromised by unequal beam intensity which may otherwise complicate the analysis of the interferograms or their use in generating measurement results. By using the same number and type of optical elements in each beam path, the modules advantageously enable common abberations in each of the beam paths to cancel out, which greatly increases performance of the back-end assembly.

Thus, where a front end assembly (not shown) provides a beam B having overlapping or superimposed wavefronts V and W (with V as a reference beam that is linearly orthogonally polarized with respect to the test beam W), the beam B enters the beamsplitter 12 at the entry 14. The beam B can be in the visible light spectrum or other regions of the electromagnetic spectrum with longer or shorter wavelengths. It is understood by one of ordinary skill in the art that the source beam B can be a relatively very fast pulse in sync with the cameras for measurement of very fast events. The first surface encountered by the wavefronts V and W is surface S2 which splits the beam B. Half of both wavefronts V and W is transmitted through the surface S2 as wavefronts V2 and W2 to reach surface S3. There, the surface S3 again splits the incidental beam, permitting 50%, namely, wavefronts V23 and W23, to reach module Mc. The reflected wavefronts at the surface S2, namely, V2$^r$ and W2$^r$ move on to reach surface S1. There, the incidental beam is split equally again, allowing transmitted wavefronts V2$^r$1 and W2$^r$1 to reach module Ma. The wavefronts reflected at surface S3, namely V23$^r$ and W23$^r$ move on to reach module Mb. As such, each of the beams is at approximately 25% of its original intensity when it reaches a module. Moreover, the wavefronts received by each module (as outputs from the cube beam splitter 12) have travelled an equal path length and have encountered substantially the same plurality and type of optical elements. In the embodiment of FIG. 1, the split ratio of the surfaces Si is preferably equal, i.e., substantially 50:50, and the surfaces preferably make no distinctions between the two states of polarization. Accordingly, despite the wavefronts V and W being split once or even more than once, all properties of the incoming beam B are preserved, except intensity.

The assembly 10 of the present invention can also accommodate a fourth module Md (not shown) which could be positioned to receive the wavefronts reflected off surface S1, namely, wavefronts V2$^r$1$^r$ and W2$^r$1$^r$. If so, a fourth, simultaneous phase shifted interferograms could be generated by the assembly 10. Alternatively, the fourth channel can also be used for an imaging system for viewing the test sample, for object alignment or other means of optical inspection.

The assembly 10 is therefore advantageously configured so that each channel traveled has substantially equal physical path lengths and beams travelling each channel encounter a similar set of optical components. The resulting symmetry is valuable in minimizing nonsymmetrical aberrations (both optical and polarization) between each of the channels. These identical channels substantially eliminate the need to re-space elements with air gaps, or insert blank optics, to achieve equal path lengths (and magnification), which simplifies the manufacturability of a monolithic form of the assembly 10. As discussed in detail further below, the components of the monolithic form are positioned in relative close proximity for alignment stability and the components may be bonded or otherwise fixed in their relative positions to provide a compact and stable assembly.

It is understood by one of ordinary skill in the art that the number of beam splitting surfaces S, encountered by any one output beam, need not be limited to those described above, but is (at least theoretically) unlimited. In order to use common phase-shifting algorithms, at least three output beams are generally necessary to generate three phase-shifted interferograms. If more beams are used and more interferograms are generated, certain errors are eliminated or minimized, and measurement accuracy can be improved. In the embodiment of FIG. 1, three output beams are used, as described below in further detail.

Up to this point, each pair of superimposed beams V and W have been in linear orthogonal states of polarization, which states have been maintained by the beamsplitter 12 since the beams were generated by the front end assembly and fed into the back-end assembly 10. However, in order for the pairs of linear orthogonally polarized beams V and W to produce an interferogram, the assembly 10 has to arrange for a common state of polarization between each pair. To that end, in accordance with the embodiment of FIG. 1, each of the imaging modules Ma, Mb, and Mc has a quarter wave plate 30, a polarizer 32 and a camera 34. As each pair of superimposed beams (with each pair comprising an linear orthogonal pair of V and W wavefronts at 25% of their original intensity) pass through the quarter wave plate 30, the polarization of one wavefront is converted into right hand circular and the polarization of the other wavefront into left hand circular. As these superimposed beams of right hand circular and left hand circular polarizations pass through the polarizer 32, the polarizer 32 defines a common polarization state for the two circular wavefronts, as is needed for the two wavefronts V and W to generate an interferogram. For example, in the embodiment of FIG. 1, the polarization of each of the wavefronts V which has been illustrated as a vector perpendicular to the plane of the page is converted by the quarter wave plates 30 into right-hand circular and the polarization of each of the wavefronts W which has been illustrated as a vector parallel to the plane of the page is converted by the quarter wave plates 30 into left-hand circular.

Significantly, by varying the rotation orientation of the polarizer, which can be controlled with relatively high accuracy, the orientation of common polarization can be varied and, more importantly, varied in a manner such that a particular orientation of common polarization can be selected by a user. By rotating the polarizer 32, a phase shift is introduced to the mutually orthogonally polarized wavefronts such that the phase difference is twice the value of the angle of rotation. Accordingly, for example, where the rotation orientation of the polarizer 32a of module Ma is set at 0 degrees, the rotation orientation of the polarizer 32b of module Mb can be set at 30 degrees (which corresponds to phase shift of 60 degrees with respect to the module Ma) and the rotation orientation of the polarizer 32c of module Mc at 60 degrees (which corresponds to phase shift of 120 degrees with respect to the module Ma). Each interference pattern behind a polarizer 32 can therefore be phase-shifted by an arbitrary but known value, depending on the angular rotation of each polarizer's axis, where the rotation orientation defines the phase delay between each pair of superimposed test and reference beams. Phase delay values such as $\pi/2$ or $\pi/3$ can easily be produced, or in fact, any other value that may be required by a phase recovery algorithm. For a given channel, or output beam, the phase shift can be introduced or changed by simply rotating the polarizer 32.

With a common state of polarization having been established in each pair of superimposed output beams V and W, those common states of polarization enable each pair to interfere to form interferograms on cameras 34a, 34b and 34c, respectively. The cameras sends electrical signals representative of the interferograms to a frame grabber (or the like) 60 via connections 40a, 40b, and 40c, respectively, for conversion into images and then into a computer 90 for analysis, including compilation into 3-D surface profiles. In the preferred embodiment, progressive scan (non-interlaced) cameras are used. So arranged, the modules Ma, Mb and Mc are enabled to generate simultaneously three phase-shifted interferograms, each of which was advantageously formed from beams that traveled equal distance and through identical optical elements.

The embodiment of FIG. 1 advantageously includes a single inexpensive color (RGB) frame grabber 60 for conversion of the signals from the cameras 34a, 34b, and 34c, where RGB represents the red, green, and blue channels of the color frame grabber. A common, inexpensive, RGB frame grabber has three channels, so this can be used to captures simultaneously the three output images from the cameras 34i. The three channel RGB frame grabber 60 provides other advantages such as displaying all three camera channels overlaid on a video monitor as a single color image in real time, or as three separate images in real time, and allowing real-time subtraction of one image with respect to another. Both of these features allow real-time verification of sub-pixel alignment for all three cameras, and can be used for various test object analyses techniques. Moreover, the present invention allows the flipping of one or two of the images on cameras 34a, 34b, or 34c either electronically or computationally using software. Electronic flipping can be accomplished with a conventional dipswitch setting on a camera, using image processor 60, computer 90, or through the use of a separate electronic circuit. Flipping some of the images is needed where some of the images on cameras 34a, 34b, and 34c can be mirror images of each other due to the number of different surface reflections in two of the beam paths. In typical situations such as this, a mirror reflection would normally be introduced to flip the desired images resulting in all images being oriented in the same direction relative to cameras 34a, 34, and 34c. Flipping electronically or through software eliminates these extra mirror(s), which is a significant advantage in keeping the entire optical assembly symmetric (all paths have the same or similar optical elements), small, compact and without introducing non-symmetric aberrations into one or more of the beam paths.

Another embodiment of the present invention (not shown) replaces the frame grabber 60 and computer 90 with a video recording device, such as an RGB video to DVD disk recorder, VCR tape recorder, or digital memory recording device. Signals sent from the modules Ma, Mb and Mc can therefore be recorded in real-time and then processed at a later time. Relatively extremely fast events in harsh environments can be monitored in this fashion as this arrangement decouples the computer from the interferometric system, which allows data to be captured relatively very quickly. The data can then be passed to a computer via a network or other means and processed remotely. The processing can be done instantly or at a later time. This process also allows multiple interferometer sites to collect data to be processed at a central computing site for enhanced efficiency and cost savings. This method of recording phase-shifted data, independent of a computer, can be applied to any phase-shifting method, including simultaneous phase-shifting.

Referring to FIG. 2, another embodiment of the present invention involves a monolithic assembly 200 using the aforementioned components of FIG. 1. The structure of the assembly 200, as understood by one of ordinary skill in the art, can be accomplished through a combination of adhesives, or laser welding parts together, or fixing parts on a common base in close proximity. The resulting monolithic unit 200, if cemented together, has no air-gaps between optical surfaces, has common beam path with common optical elements, and can resist misalignment and damage in rugged and harsh environments. Also, the monolithic unit can be miniaturized allowing it to be used in handheld instruments for indoor and outdoor applications. This configuration of the instant phase shifting module of the present invention advantageously integrates beamsplitter 212, waveplates 230$i$, polarizers 232$i$, and cameras 234$i$ resulting in a complete phase-measuring module. The module can be several cubic inches in size, one cubic inch in size, or scaled even smaller. A very tiny module can be fabricated with tiny optical components, and very small cameras such as complete cameras that are on a single microelectronic chip. The architecture is scaleable in size and could even be taken to the size of MEMS and integrated optics, as discussed further below.

A compact assembly of optics and CCD cameras is desirable for measuring test object parameters using three or more simultaneously phase-shifted interferograms. Where the optics and CCD arrays are be bonded together to form a single monolithic module, or packaged in a concise stable mechanical arrangement, the phase shifting assembly 200 is miniaturized, stable and robust, not prone to misalignment in rugged and harsh environments. Since multiple interferograms are acquired simultaneously, fast camera frame rates and shutter speeds can be used to capture interferograms of dynamic events. The ability to capture phase-shifted interferograms simultaneously also eliminates the need for expensive vibration isolation, and enables an interferometer to be use in dynamic environments; this enables the use of interferometry in portable and hand held instruments. Accordingly, the monolithic assembly 200 is particularly suited for measuring material properties such as gas density, index of refraction, three dimensional surface profiles, and dynamic properties of fast moving objects such as dynamic MEMS (Micro Electro-Mechanical Systems).

FIG. 3 illustrates another embodiment of the present invention. Assembly 310 is shown having beamsplitter 312 and modules Na, Nb, and Nc arranged in a similar configuration as FIG. 1. However, the modules Na, Nb and Nc differ from the modules Ma, Mb and Mc of FIG. 1 in that the three respective quarter wave plates 30$a$, 30$b$ and 30$c$ have been replaced by a single quarter wave plate 350 that is situated to intercept the beam B near entry 314 of the beamsplitter 312. In this embodiment, the surfaces S of the beamsplitter 312 have been specially adapted, as understood by one of ordinary skill in the art, to accommodate and handle the converted states of polarization downstream of the quarter wave plate 350.

In another embodiment (not shown), the back-end assembly does not use any quarter waveplates, provided that the incidental beam already has circular orthogonally polarized test and reference wavefronts entering the beamsplitter. In this embodiment, the splitting surfaces of the beamsplitter are further adapted to preserve the circular polarization of the beams that traverse the beamsplitter.

For the two foregoing embodiments, if the surfaces S of the beamsplitter 312 are not specially adapted, fractional retarders would be used in front of the polarizers to circularize the states of polarization.

FIG. 4A illustrates an embodiment of a back end system 400 that utilizes two back end assemblies 410A and 410B for generating six or eight phase-shifted interferograms. Each of the assemblies 410A and 410B may be configured in accordance with any of the back-end assemblies 10, 210 and/or 310 of FIG. 1, 2 or 3. More sophisticated algorithms may be used with this configuration to enhance accuracy or compensate for other types of errors, such as camera non-linearities. As understood by one of ordinary skill in the art, the parallel architecture or configuration can be continued indefinitely for any number of phase-shifted interferograms.

The parallel architecture of system 405 of FIG. 4B can accommodate a second incidental beam B' (composed of superimposed linear orthogonally polarized wavefronts V' and W') having a different wavelength than that of the aforementioned beam B. The different wavelengths allow interferometric algorithms to be used for much greater dynamic height ranges of measurement over small areas, as the $2\pi$ limitation present with single wavelength measurements is reduced.

Each of the two back end assemblies 410A and 410B is downstream of respective optical band pass filters 411A and 411B; In turn, each of these optical band bass filters is downstream from a beamsplitter 460 to intercept an output from the beamsplitter. As beams B and B' enter the beamsplitter 460, both beams are split such that half of each beam passes through surface F while the other halves are reflected off the surface. Transmitted beams B1 and B'1 proceed to encounter filter 411A which has been selected or tuned to pass wavefront B only. Accordingly, reflected beams B'1 and B''1 proceed to encounter filter 411B which has been selected to pass wavefront B' only. The two back end assemblies 410A and 410B then perform the same function (as assembly 10 in FIG. 1) on both beams for phase-shifted interferogram acquisition which results in two sets of phase-shifted interferograms. In accordance with the present invention, the system 200 (FIG. 2) acquires all phase-shifted interferograms simultaneously, notwithstanding the different wavelengths of the beams B and B'. Likewise, the parallel architecture can be continued indefinitely for acquiring any number of phase-shifted interferogram sets, with each set at a different wavelength.

The optical filters 411A and 411B can be fixed filters, variable mechanical filters, tunable grating filters, liquid crystal tunable filters, or other filter types either fixed or tunable. Using tunable filters allow the selection of height dynamic range and resolution of the measurement. In lieu of the filters 411A and 411B, the beamsplitter 460 can be constructed with wavelength selective surfaces or components such that only certain wavelengths are transmitted and others wavelengths reflected. Wavelength division and selection can also be accomplished by using a combination of interactions between the optical surfaces of 460, or by using a combination of interactions between the optical surfaces of 460 and 411A and 411B. Again, the source beams B and B' can be pulsed rapidly in sync with cameras 34$i$ of the assemblies 410A and 410B for measurement of fast events, and the source of beams B and B' can be a laser or lasers, a LED or LEDs, VSCEL, or other sources.

Moreover, the beams B and B' can have a common source with a larger wavelength bandwidth, which will permit the filters 411A and 411B to select smaller bands of light within the single common source. In a preferred embodiment, the assemblies 410A and 410B and beamsplitter 460 can be combined into a single unit, either monolithic or in a concise stable mechanical arrangement, for multi-wavelength simultaneously phase-shifted interferogram acquisition in rugged environments. The unit can be several cubic inches in size, one cubic inch in size, or scaled even smaller. A very tiny unit can be fabricated with tiny optical components, and very small cameras such as complete cameras that are on a single microelectronic chip. The architecture is scaleable in size and could even be taken to the size of MEMS and integrated optics. Photonic crystal technology could be used to perform beam splitting functions and polarization control functions.

In yet another embodiment for multi-wavelength measurements, three wavelengths, preferably red, green, and blue (RGB) are used. This arrangement is useful for a variety of applications including for the measurement of fast step height changes on surfaces. On embodiment provides a source beam that is a combination of red, green, and blue beams, R, G and U, where each of these beams is composed of linear orthogonally polarized test and reference wavefronts. Referring to FIG. 5, all three beams R, G, U pass through a beam splitting assembly 512, then through quarter wave plates 530a, 530b, 530c and then through polarizers 532a, 532b, 532c. All three beams R, G, U are then projected onto cameras 534a, 534b, 534c. In this RGB mode, these optical components (namely, these quarter wave plates and polarizers) are selected to perform across the RGB wavelength range (achromatic) and these cameras would be color cameras. The color cameras can be three CCD color cameras, one CCD color cameras, or, in a preferred embodiment, they can be a color camera using Foveon technology, which has the advantage of the RGB color pixels being layered in the z-direction (optical axis direction) as compared to in the x-y plane of the CCD. The real time collection of three phase-shifted wavelengths has significant advantages in speed and robustness. In a preferred embodiment the three lasers can be replaced by a single white light source such as a white light laser or white light LED.

It is understood by one of ordinary skill in the art that the described embodiments of the present invention can be modified such that one of the quarter wave plates in front of a camera is removed, and the path length to this camera made equal to the other path lengths by re-spacing the camera or adding a blank makeup glass if necessary. Moreover, the above described embodiments of the invention can also be modified by using a diffraction grating instead of the beamsplitter outputting into the imaging modules, and using only one CCD (or multiple CCDs), where a quarter waveplate and rotatable polarizer are positioned in front of each of the split channels, before the image sensor, to select the phase-shift.

As mentioned, the three quarter wave plates in front of their respective polarizers of the imaging modules can be replaced by one-quarter waveplate in front of the beamsplitter, providing that the beamsplitter preserves the circular polarization of the input beam, at each output beams. Similarly, a quarter waveplate can be placed in front of a diffractive type beamsplitter, where the beamsplitter is made to preserve the circular polarization of the incoming beam. A rotatable polarizer is then positioned in front of each of the split channels before the image sensor, to select the phase-shift. Where the beamsplitter does not preserve the circular polarization of the input beam, a waveplate of appropriate retardation can be used in front of the polarizers to compensate for the phase delay introduced by the beamsplitter.

The beamsplitter preceding the imaging modules can be any beam splitting arrangement with equal intensity outputs and equal path lengths. For example, prism arrangements such as an X-Cube, K-prism or Phillips Prism extended to three or more channels, or other splitting arrangements, and extensions of the prism arrangements to make an even greater number of outputs. The method of dual/multiple wavelength simultaneous capture (FIG. 5) can be used with other methods of simultaneous phase-shifting interferometry by cascading in a modular fashion.

What is claimed is:

1. A back-end assembly for use with a front-end assembly in acquiring phase-shifted interferograms, comprising, in combination:
   a beamsplitter configured to receive an incidental beam and to output at least three exit beams; and
   at least three imaging modules, each imaging module positioned to receive a respective exit beam, and each module having a quarter wave plate a polarizer and an image sensor,
   wherein the beamsplitter is configured to define substantially equal path distances for all said exit beams that reach an imaging module,
   wherein each imaging module is configured such that each said respective exit beam encounters said quarter wave plate and said polarizer so as to form an interferogram on said image sensor, and
   wherein each polarizer of a respective imaging module has a different rotation orientation from polarizers of said other imaging modules for acquiring said phase-shifted interferograms.

2. The back-end assembly of claim 1, wherein said incidental beam comprises two wavefronts with mutually orthogonal states of polarization.

3. The back-end assembly of claim 2, where said beamsplitter is configured to provide an equal plurality of surface interaction with each of said exit beams.

4. The back-end assembly of claim 1, wherein said front-end assembly is of a Fizeau type configuration.

5. The back-end assembly of claim 1, wherein the beamsplitter is configured such that all said exit beams have substantially equal intensity at incidence on their respective modules.

6. The back-end assembly of claim 1, wherein surfaces of said beamsplitter receiving said incidental beams are polarization-preserving.

7. The back-end assembly of claim 1, wherein all of said exit beams reach their respective modules substantially simultaneously for enabling the assembly to acquire said phase-shifted interferograms substantially simultaneously.

8. The back-end assembly of claim 1, wherein said incidental beam comprises two wavefronts with mutually linear orthogonal states of polarization.

9. A back-end assembly for acquiring phase-shifted interferograms, comprising, in combination:
   a beamsplitter configured to receive two superimposed orthogonally polarized beams, said beamsplitter having surfaces to split said beams into at least a selected plurality of exit beams, wherein each of said exit beams contains an equal portion of each of said two superimposed orthogonally polarized beams; and
   imaging modules of said selected plurality, each positioned to receive one of said exiting beams, each imaging module having a polarizer and an image sensor, wherein each polarizer of a respective module is positioned between said beamsplitter and said image sensor and has a selected rotation orientation different from other polarizers of said other imaging modules for enabling said assembly to acquire said phase-shifted interferograms;
   wherein the assembly is configured such that each of the exit beams travels a substantially equal physical path length to arrive at imaging sensors.

10. The back-end assembly of claim 9, wherein each imaging module further comprises a quarter wave plate positioned between the beamsplitter and its respective image sensor.

11. The back-end assembly of claim 9, further comprising a quarter wave plate positioned to act on said two superimposed orthogonally polarized beams before entry to the beamsplitter.

12. The back-end assembly of claim 9, comprising three said imaging modules.

13. A monolithic back-end assembly for acquiring phase-shifted interferograms, comprising, in combination;

a beamsplitter configured with an input to receive incidental beams, and a selected plurality of outputs for exiting beams;

a selected plurality of imaging modules, each module positioned relative to one of said outputs to receive an exiting beam and each module having a quarter wave plate, a polarizer and a camera, wherein in each imaging module the quarter wave plate is positioned between the beamsplitter and the camera, and the polarizer is positioned between the quarter wave plate and the camera, and further wherein each polarizer has a different rotation orientation relative to said other polarizers for acquiring said phase-shifted interferograms wherein said beamsplitter and said modules are fixedly connected to each other.

14. The monolithic back-end assembly of claim 13, wherein within each of said imaging modules, its respective quarter wave plate is fixedly connected to its respective polarizer which is fixedly connected to its respective camera.

15. The back-end assembly of claim 13, comprising three said imaging modules.

16. A back-end system for acquiring dual wavelength phase-shifted interferograms, comprising, in combination:

a beamsplitter configured to receive two incidental beams of different wavelengths and having a surface to split said two beams into two exiting beams, each of which contains an equal portion of each of said two incidental beams; and two back-end assemblies of claim 1, 10 or 13, each positioned to receive one of said exiting beams.

17. A back-end system for acquiring multiple sets of phase-shifted interferograms, comprising, in combination:

a beamsplitter configured to receive an incidental beam and having a surface to split said two beams into two exiting beams, each of which contains an equal portion of each of said two incidental beams; and two back-end assemblies of claim 1, 10 or 13, each positioned to receive one of said exiting beams.

* * * * *